July 8, 1941.                H. BOERSCH                    2,248,604
                 INDICATING DEVICE FOR LECHER SYSTEMS
                       Filed April 26, 1940

Inventor:
Hans Boersch,
by *Harry E. Dunham*
His Attorney.

Patented July 8, 1941

2,248,604

UNITED STATES PATENT OFFICE 2,248,604

INDICATING DEVICE FOR LECHER SYSTEMS

Hans Boersch, Berlin, Germany, assignor to General Electric Company, a corporation of New York Application April 26, 1940, Serial No. 331,891
In Germany February 6, 1939

3 Claims. (Cl. 177—311)

My invention relates to current indicating devices and has for one of its objects the provision of an improved arrangement for indicating current nodes and current loops in lecher systems without drawing excessive energy from the system.

For the measurement of wave length in very high frequency electrical circuits it has been customary to employ what are known as parallel conductor systems or lecher wire systems for measuring the wave length. In these systems, the actual length of the half wave is physically measured by measuring the distance between current nodes or current loops in the parallel wires which have been energized with an alternating current, the wave length of which is to be determined.

Figure 1:
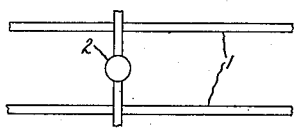

To indicate the current nodes and current loops in such oscillating lecher systems there have generally been used small incandescent lamps, bolometers or thermo-elements. All of these instruments are based upon the lecher wires being bridged over by a device which is heated on the passage of current. This is shown in Fig. 1 for an incandescent lamp. The two lecher wires are indicated by 1, while the incandescent lamp is represented by 2. It is so designed that its two leads loop each on one of the wires, so that a current flows through the incandescent lamp when the leads are not exactly at the position of current nodes of the wires 1. The intensity of the oscillation taking place at the point in question of the lecher system can be gathered from the brightness of the incandescent lamp and in this way there can be found the maxima and minima of this oscillation, that is, the current loops and the current nodes. Bolometers and thermo-elements act in like manner. The incandescent lamp and also the other instruments however have the drawback that they take away from the lecher system a comparatively large amount of energy in the form of heat. It is for example necessary for the indication to heat the incandescent filament of the lamp to about 600° C.

In order to obviate this drawback, according to the invention in its preferred form there is to be employed for the indication an electrically conductive rod bridging over the lecher system and which is coated with one or more heat-indicating colors, the shade of which is clearly determined by the temperature of the rod.

Heat indicating colors are characterized by changing hue at definite temperatures. This property is shown by a double salt, such as mercurous iodide-silver iodide, for example, which at about 45° C. changes its yellow color into orange. If desired, some other member of the copper family in the periodic arrangement of elements may be substituted for the silver. Thus mercurous iodide-copper idide may be employed which changes at over 70° C. from red to black. Other compounds include arsenic-antimony and lead as heat-indicating colors. Organic color changing substances which may be employed include α-phenyl-δ diphenylene fulgide or α-diphenylene δδ-diphenylfulgid, of which the first is dark red at room temperature and is purple at temperatures between 54 and 152°, whereas the second at room temperature is Bordeaux red and is dark blue at temperatures between 76 and 156° C. All these colors with which the rod serving for the indication can for example be coated are reversible in their thermo-chronic behavior, i. e. when a change of temperature is reversed then the original shade of color appears. The color is therefore clearly determined by the temperature. This latter property is to be possessed by all the heat indicating colors coming into use within the scope of the invention.

Figure 2:
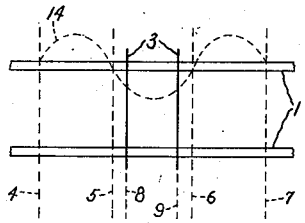

The invention will be understood more readily from the following detailed description when considered in connection with the accompanying drawing and those features of the invention which are believed to be novel and patentable will be pointed out in the claims appended hereto. In the drawing, Fig. 1 is a schematic diagram illustrating a lecher wire system of the type already known prior to my invention. Fig. 2 is a schematic diagram illustrating an embodiment of my invention and showing the manner in which current nodes are located; and Fig. 3 is a schematic diagram illustrating a modified form of apparatus embodying my invention.

An example of the color changing property determined by temperature as set forth in this invention is shown in Fig. 2. In this, two lecher wires are indicated by 1, while 3 represents an indicating rod according to the invention. This rod is electrically and preferably metallically conductive, and is provided at least over one zone of its surface with an indicator color, the shade of which depends upon the temperature at which the rod is heated on the passage of the current. The positions of the current nodes of the lecher system are indicated by 4, 5, 6, 7. The variation in current intensity along the lecher wires is represented by the broken line curve 14. By means of the indicator rod, according to the invention, it is quite simple to determine the energy of the lecher system; it is only necessary for this purpose to determine those consecutive points 8 and 9 at which a given change of color takes place in the one or in the other sense, on the wire. From the distance apart of the two points 8 and 9 at a given change in the color, compared with the distance between the current nodes 5 and 6, there is then given a measure of the energy of the lecher system. The indicator rod, when it is dimensioned with a relatively small diameter takes but little energy from the lecher system since it must be heated only to the vicinity of those temperatures at which a change of color takes place. These temperatures are, however, comparatively low if compared for example with those of an incandescent filament. As the above mentioned examples of heat indicator colors show, even temperatures up to 50° are sufficient. To attain the object of still less energy being taken by the indicator rod from the lecher system it can be preheated by radiated heat or hot air up to the vicinity of the color changing point. The indicator rod according to the invention can naturally also serve to determine the current loops. To this end it is only necessary to determine the center between the points 8 and 9 at which the same color change takes place; there is then at this center point a current loop if the points 8 and 9 directly follow each other with respect to the change of color.

Figure 3:
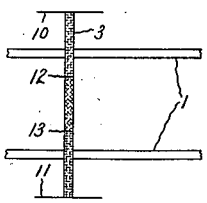

A further possibility for determining the energy of a lecher system is shown in Fig. 3. According to this, the indicator rod 3 carries at its two ends cooling vanes 10 and 11 which are to cause a cooling of the rod at the two ends. There takes place on the rod a temperature drop which is characterized by two points 12 and 13 which are located symmetrically to the lecher wires 1 and at which the rod changes its color. From the distance between the points 12 and 13 there can be determined the steepness of the temperature drop and thus the energy of the lecher system. Although I have shown 10 and 11 as cooling devices, it will be understood that my invention is not limited to this specific arrangement. For example, if desired the apparatus may be so arranged that the lecher wires themselves serve to carry away the heat energy.

Under certain circumstances, it will be advisable to apply a number of indicator colors on the indicating rod in order to check measurements which are given by the change of one color, with other colors, or in order to be able to choose from different possibilities that one which is most suitable.

The indicator rod can naturally also be formed as a band or wire.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. An indicating device for a lecher system comprising an electrically conducting rod adapted to bridge over the lecher system coated with a material having the property of varying in color in accordance with variations in temperature, and having cooling fins attached at the ends thereof to produce points of color change, the positions of which on the rod are dependent upon the current therein.

2. An indicating device for a lecher system comprising an electrically conducting rod adapted to bridge over the lecher system, coated with a material having the property of varying in color in accordance with variations in temperature, and having means in contact with the ends of the rod for cooling the same to produce points of color change, the positions of which on the rod are dependent upon the current therein.

3. A current indicator comprising an electrically conducting rod, a coating thereon comprising material having the property of varying in color in accordance with variations in temperature, and means for cooling a portion of the rod to produce a point of color change, the position of which on the rod is dependent upon the current therein.

HANS BOERSCH.